United States Patent [19]

Carter

[11] Patent Number: 4,900,137
[45] Date of Patent: Feb. 13, 1990

[54] MIRRORS

[75] Inventor: Walter S. Carter, Bracknell, United Kingdom

[73] Assignee: British Aerospace Public Limited Company, London, England

[21] Appl. No.: 89,399

[22] Filed: Aug. 26, 1987

[30] Foreign Application Priority Data

Sep. 6, 1986 [GB] United Kingdom ............... 8621510

[51] Int. Cl.$^4$ .............................................. G02B 5/30
[52] U.S. Cl. ................................. 350/395; 350/397; 350/164; 350/166
[58] Field of Search ............... 350/395, 397, 164, 166

[56] References Cited

U.S. PATENT DOCUMENTS

| 3,427,089 | 2/1969 | Webb | 350/166 |
| 3,851,973 | 12/1974 | Macek | 350/164 |
| 3,927,946 | 12/1975 | McClure | 356/106 |

FOREIGN PATENT DOCUMENTS 2006456  5/1979  United Kingdom .

OTHER PUBLICATIONS

O. S. Heavens, "Optical Properties of Thin Solid Films", Butterworth Scientific Publications (1955), pp. 46–47.

I. M. Minkov, "Theory of Dielectric Mirrors in Obliquely Incident Light", Optical Spectroscopy (U.S.A.), vol. 33, No. 2, pp. 175–178.

Primary Examiner—Bruce Y. Arnold
Attorney, Agent, or Firm—Cushman, Darby & Cushman

[57] ABSTRACT

A mirror for a ring laser gyroscope comprising a multilayer dielectric stack and a layer having an optical thickness of a half wavelength so as to enhance absorption of s-polarized radiation relative to that of p-polarized radiation.

7 Claims, 5 Drawing Sheets

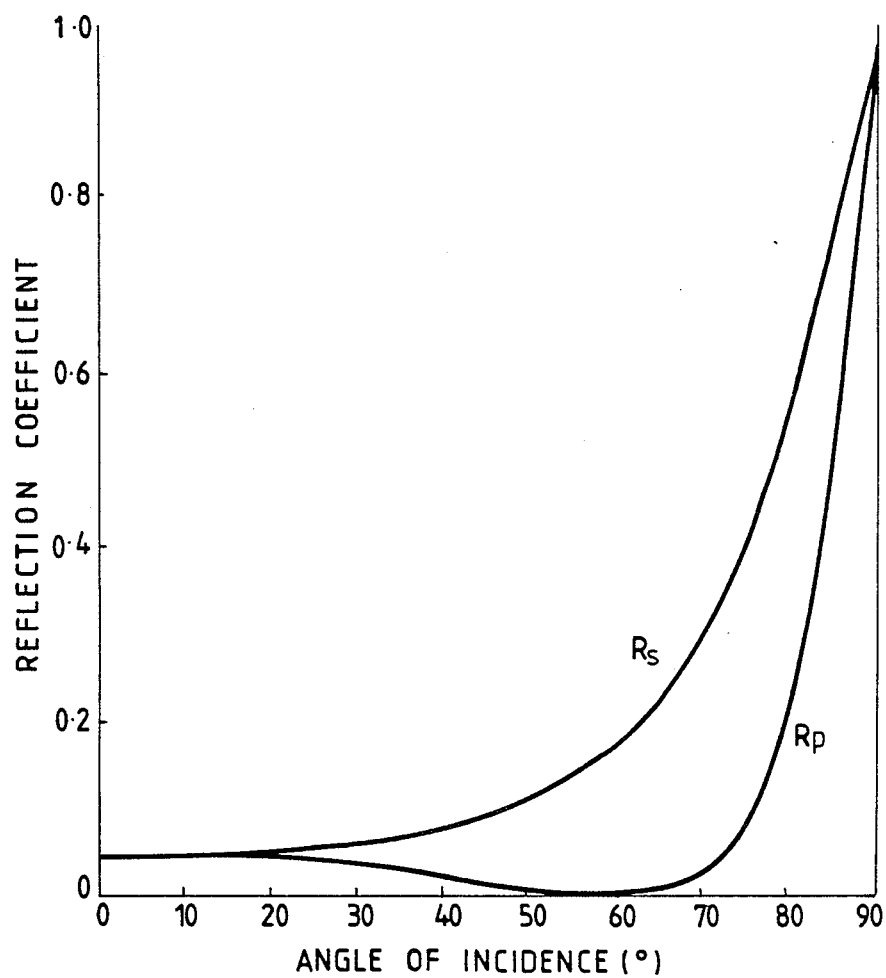
Fig. A
(PRIOR ART)

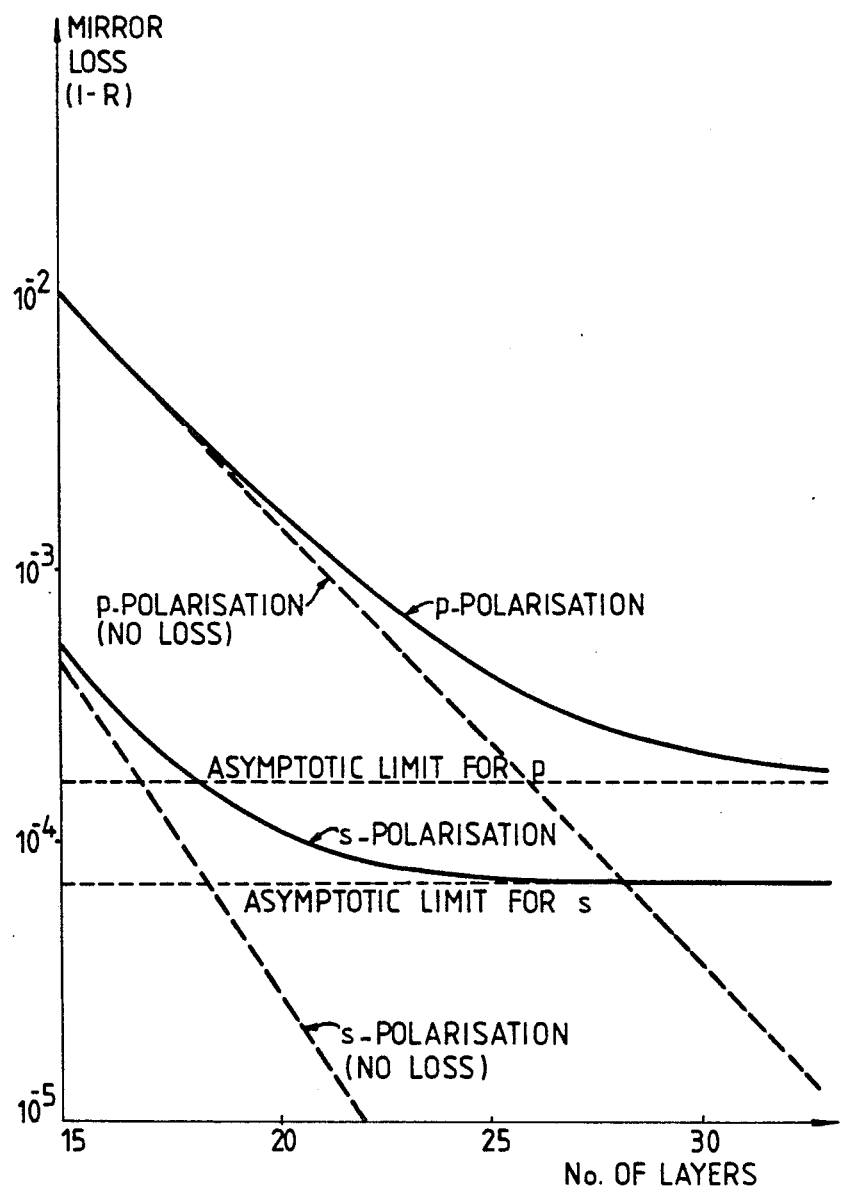
Fig.B (PRIOR ART)

MIRRORS

This invention relates to mirrors and is more particularly concerned with the mirrors used in ring laser gyroscopes. As background, there are two principal modes of polarization obtained when plane polarized light is reflected from a surface. These modes are defined by the relationship between the electric vector (E vector) of the incident light and the plane of incidence. Using the convention given in "Optical Properties of Thin Solid Films" by O. S. Heavens published by Butterworth Scientific Publications (1955), p-polarized light is defined as having the E vector in the plane of incidence and s-polarized light as having the E vector normal to the plane of incidence. In general, if the incident radiation is p- or s-polarized, the plane of polarization of the reflected light is unchanged. However, if the surface is made from a magneto-optically active material this does not hold. Furthermore, if the incident polarized light is polarized in any other plane than the plane of reflection, the plane of polarization of the reflected radiation will, in general, be rotated by the reflection.

Ring laser gyroscopes exhibit the phenomenon of "lock-in", where at low rotation rates, the two counter-rotating beams are locked to the same frequency and no frequency difference is observed until a certain higher rotation rate is attained. "Lock-in" is due to an interaction between the two lasing beams and even above the certain higher rotation rate, the effects of the interaction between the two beams is shown by the way they make the scale factor non-linear. The effect of "lock-in" can be overcome practically by providing a bias mechanism. The most commonly used method of providing this bias mechanism at present is the application of a dither frequency to the ring laser gyroscope. However, of several non-mechanical methods which have been suggested, the most attractive alternative to dither is the so-called "magnetic mirror". This was proposed in U.S. Pat. No. 3,851,973 and discloses the use of the magneto-optic properties of pure iron in the infrared region of the electromagnetic spectrum. Alternative "magnetic mirrors" using ferromagnetic garnet materials are disclosed in UK Patent 2006456 and U.S. Pat. No. 3,927,946.

Magnetic mirrors apply a differential phase shift to the counter-rotating beams due to the transverse Kerr effect but only when the beams are p-polarized. Therefore, to utilise this phenomenon it is essential that the ring laser gyroscope should lase in a p-polarized mode. This presents no difficulty in a modular lasing cavity where the mode of polarization is defined by the orientation of the Brewster angle windows on the discharge tube. However, an integral lasing cavity preferentially lases in the s-polarized mode because the mirrors currently employed in ring laser gyroscopes exhibit a greater reflection coefficient for s-polarized light than for p-polarized light.

For two dielectric materials forming an interface, the reflection coefficient, R, at the interface is greater for s-polarization ($R_s$) than for p-polarization ($R_p$) as illustrated in FIG. A. This difference is enhanced by a multilayer dielectric mirror of the type used in ring laser gyroscopes which is made of alternating layers of two dielectric materials having different refractive indices so that the ratio $R_p/R_s$ is always less than 1. At normal incidence, however, there is no distinction between the two polarizations. When absorption loss is taken into account the ratio of $R_p/R_s$ remains less than 1 but the reflectivities for both polarizations reach an asymptotic limit as the number of layers increase. This is known as the Koppelmann limit and is illustrated in FIG. B for a stack having a lossy high refractive index material with $n=2.3$, and $k=5\times10^{-5}$, a non-lossy low refractive index material with $n=1.46$ and an angle of incidence of $45°$.

The graph of FIG. B emphasises the necessity for using more layers when formulating a mirror for reflection in the p-polarization mode if a particular value of reflectivity is required.

The invention involves the use of a multilayer dielectric (MLD) reflecting stack comprising alternate layers of two dielectric materials having high and low refractive indices respectively and both having low absorption. To form a mirror each layer is made to have an optical thickness of a quarter wavelength of the radiation to be reflected, taking into account the angle of incidence of the radiation.

As is well known, such an arrangement ensures that, for both p- and s-polarized light, the beams reflected from neighbouring layer interfaces reinforce and, if a sufficient number of layers is used, very high reflectivities can be obtained. A mirror would typically be made by depositing alternate layers of titanium dioxide ($TiO_2$) and silicon dioxide ($SiO_2$) onto a substrate of Zerodur. The initial and outermost layer being ($TiO_2$). Typical values for the refractive indices being 2.3 to 2.4 for the $TiO_2$ and 1.46 for the $SiO_2$. The loss coefficients, the k of the complex refractive index ($n-ik$), being 5 to $10\times10^{-6}$ and 1 to $3\times10^{-7}$ respectively.

Generally such a mirror will have a half wave coating of $SiO_2$ on top of the outermost $TiO_2$ layer. This layer does nothing optically and is sometimes known as an absentee layer. Its purpose is to provide protection to the underlying $TiO_2$ layer from the environment. Such a layer will not be considered in the following discussion, it being understood that it can be added, if desired, to any of the designs considered.

A method which has been proposed to produce a mirror for use with a laser which preferentially lases in the p-polarized mode involves the use of an anti-reflection coating which is polarization sensitive (I. M. Minkov, Optical Spectroscopy (USA), Vol. 33, No. 2, p. 175–178). The multilayer dielectric mirror so proposed comprises a repeat of a three layer anti-reflection coating which is more reflective for the p-polarized mode than for the s-polarized mode. However, the effect of absorption of light in the layers of such a mirror renders the proposal impractical.

According to the present invention we provide a mirror comprising a multilayer dielectric (MLD) reflective stack which is designed to enhance the reflection of p-polarized light relative to that of s-polarized light.

Thus the present invention enables the provision of a ring laser gyroscope in which the cavity preferentially lases in the p-polarized mode so that the transverse Kerr magneto-optic effect can be utilised to prevent the occurrence of lock-in of the counter-rotating beams.

Preferably, a mirror according to the invention is designed to enhance the absorption of s-polarized light relative to that of p-polarized light.

This feature makes use of the fact that the dielectrics are slightly absorbing and in particular those with a high dielectric constant generally have a higher absorption coefficient than those with a low dielectric constant. At optical frequencies, the dielectric constant of a material is approximately equal to the square of the refractive index, assuming a permeability of unity. To obtain a higher reflectivity for p-polarized radiation, the MLD design is modified so that the absorption is increased preferentially for the s-polarized component to such an extent that it reduces the level of the reflectivity so that it is less than that for the p-polarized component.

The thickness of one or more layers of the MLD reflective stack may be chosen so as to depart from optimum reflectivity and thereby preferentially increase the absorption for the s-polarized component.

Thus absorption can be achieved satisfactorily by making an MLD stack with the outermost layer of a quarterwave of high refractive index, the next layer having a half wave of low refractive index and the rest of the layer quarter wave. An alternative is to make the outermost layer a half wave of high refractive index and the rest quarter wave.

Alternatively, the mirror may be designed to enhance the transmission of s-polarized light relative to that of p-polarized light. In this case, the mirror may comprise a metal layer underlying a control dielectric layer and the MLD reflective stack. In another embodiment to be described, the mirror comprises an off-tune MLD underlying a control dielectric layer and the MLD reflective stack.

For a better understanding of the invention, reference will now be made, by way of example, to the accompanying drawings in which.

FIG. A illustrates the known reflection coefficients, for two dielectrics forming an interface, as a function of incidence angle. FIG. B illustrates the known Koppleman limit.

Figure 1:
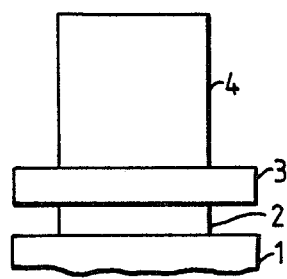
FIG. 1 is a schematic diagram of a mirror according to the invention.
Figure 2:
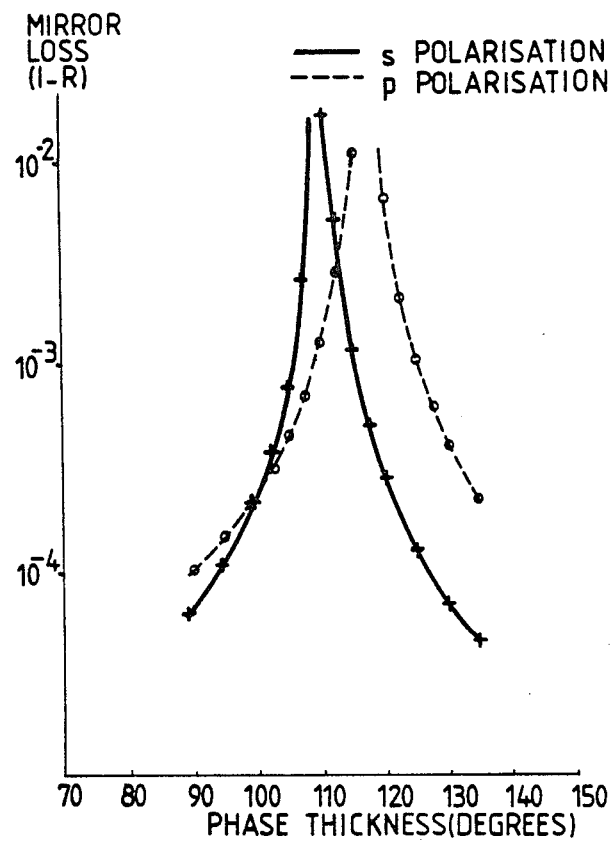
FIG. 2 is a graph of mirror loss against phase thickness for both p- and s-polarized light for the mirror of FIG. 1.

The mirror shown in FIG. 1 is in the form of a Fabry-Perot filter and comprises a substrate 1 on which a gold or silver film layer 2 is deposited. A control layer of dielectric material 3 is then formed on the film layer 2. On top of the control layer 3 is formed a multilayer dielectric stack 4 comprising alternate quarterwave layers made of dielectric film material. The control layer 3 acts as a halfwave spacer while the rest of the layers make up the quarterwave reflecting stack as shown in FIG. 1. For such a filter, the pass band ie. the transmission peak, is different for the p- and s-polarized modes (ignoring losses in the dielectric film layers of the stack 4) as shown in FIG. 2. Thus choosing the thickness of the control layer 3 can enhance transmission of s-polarized light, as indicated for example by the vertical dotted line in FIG. 2, relative to that of p-polarized light thereby increasing the reflectivity of p-polarized light relative to s-polarized light. The filter of FIG. 1 has the main disadvantage that the thickness of the control layer 3 needs to be controlled very accurately.

Figure 3:
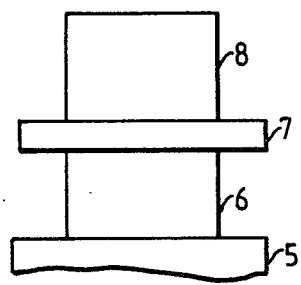
FIG. 3 is a schematic diagram of a mirror according to a second embodiment of the present invention.

In the embodiment of FIG. 3, the metallic layer 2 is replaced by a twenty layer multilayer dielectric which is off tune so that a phase shift somewhere between 0° and 180° is obtained. The use of an off-tune multilayer dielectric imparts a polarization dependence to the mirror arrangement.

Figure 4:
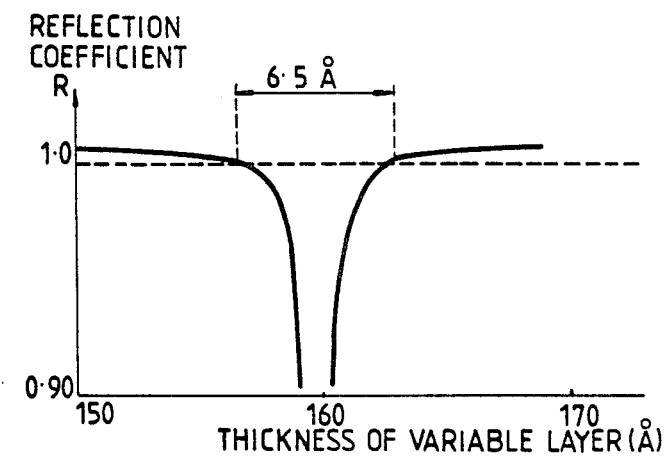
FIG. 4 is a graph of reflection coefficient against thickness of the control layer for the mirror of FIG. 3.

The stack of FIG. 3 comprises a substrate 5 on which is formed a twenty-layer multilayer dielectric 6 which is off tune. A variable thickness layer 7 is formed on top of this dielectric and comprises a layer of garnet ($TiO_2$). A fourteen-layer multilayer dielectric 8 is formed on top of the variable layer 7—this layer is on tune. The reflection coefficient (R) plotted against the thickness of layer 7 is shown in FIG. 4 for both p- and s-polarization modes. From the figure it can be seen that for an angle of incidence of 45°, the reflection coefficient for p-polarization is a constant value whereas the reflectivity for s-polarization drops off to produce a wave band around 6.5Å where $R_s < R_p$. This arrangement also suffers from the practical difficulty of getting the pass band for s-polarization on tune. Again FIG. 4 does not include any compensation for absorption loss. When losses are considered, the width of the pass band of the FIG. 3 stack is increased and makes the design more practical.

Figure 5:
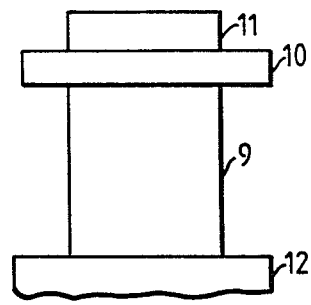
FIG. 5 is a schematic diagram of a mirror according to a third embodiment of the present invention.
Figure 6:
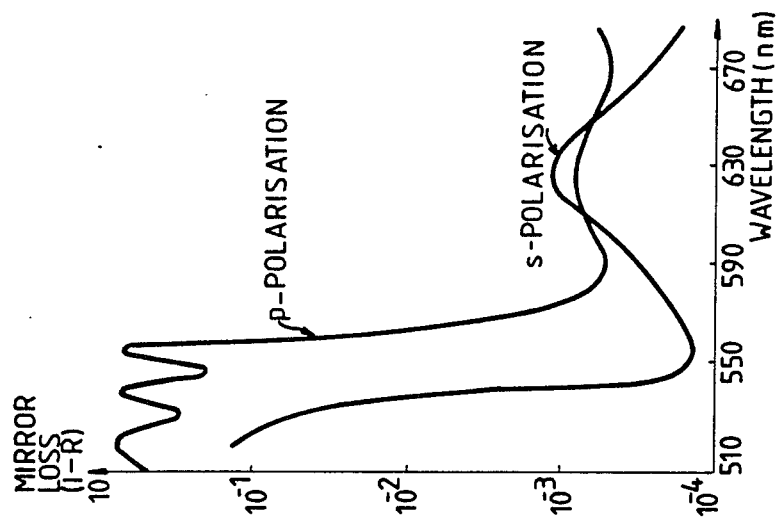
FIG. 6 is a graph of mirror loss against wavelength for the mirror of FIG. 5.

It is possible to design a multilayer dielectric having $R_p > R_s$ by making either the first or second layer of the stack a half-wavelength thick. A thirty-five layer stack is shown in FIG. 5 where the stack is formd by a multilayer dielectric 9, a halfwave layer 10 of silicon dioxide ($SiO_2$) and a quarterwave layer 11 of garnet all on a substrate 12. The response of this stack is shown in FIG. 6 and provides a more practical solution to producing a lasing cavity which preferentially lases in the p-polarized mode.

It is thought that this embodiment works by enhancing the absorption of s-polarized light relative to that of p-polarized light. p and s-polarized light set up different types of standing waves in a MLD reflective stack. The standing wave for s-polarized light is of continuous relatively simple sinusoidal form whereas that for p-polarized light is of a discontinuous and complex form. In this embodiment according to the invention, this difference is exploited by arranging the mirror so that absorption is enhanced where this will most affect s-polarized light ie. at the intensity maxima of the s-polarized light standing wave.

In practice it is found that maximising absorption of s-polarized light also helps to maximise the differential phase shift applied to counter-rotating laser beams when a suitable magneto-optic layer, such as a layer of garnet material, is included in the mirror.

Figure 7:
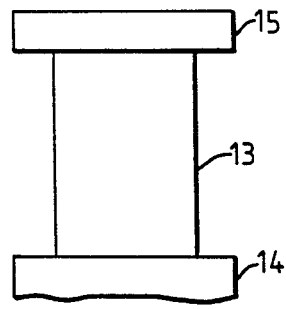
FIG. 7 is a schematic diagram of a fourth embodiment of the present invention.

By providing fewer layers in the MLD reflecting stack a transmitting mirror can be produced as shown in FIG. 7 in which the MLD 13 comprises twenty seven layers mounted on a substrate 14. A half-wavelength dielectric layer 15 of high refractive index overlies the MLD 13, the top layer of which is a quarter wave layer of low refractive index.

Figure 8:
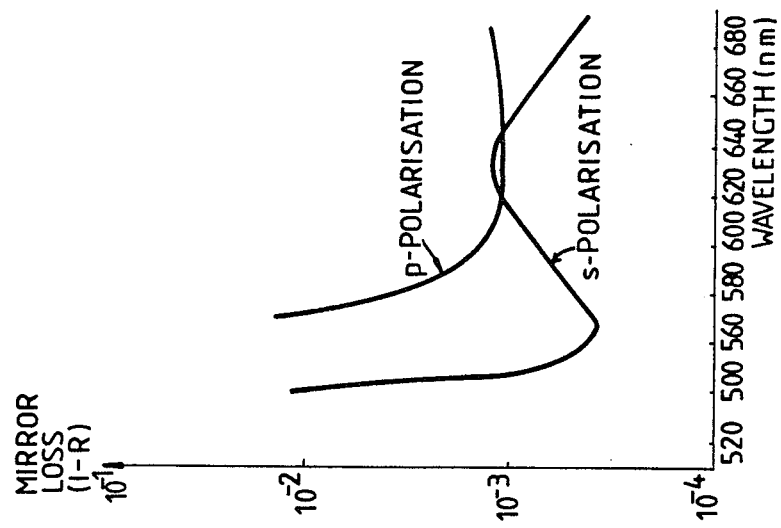
FIG. 8 is a graph of mirror loss against wavelength for the mirror of FIG. 7.

The results obtained are shown in FIG. 8 showing that Rp>Rs in the approximate waveband 620 to 645 nm.

It has been found that using a half-wavelength layer further down in the MLD stack for a transmitting mirror enables a greater difference between the reflectivities of p- and s-polarized light to be obtained but over a relatively narrower waveband.

The results referred to are obtained using a standard computer program for MLD devices. The results shown in FIGS. 2, 4, 6 and 8 are for an angle of incidence of 45°, but naturally other angles of incidence are possible with corresponding modifications of the graphs to allow for changes in absorption in the dielectric materials used.

An appendix follows which provides an analytical approach for a simple case showing the effect of incorporating a half-wavelength layer of low refractive index next to the top of an MLD reflective stack.

APPENDIX

Using the notation of Liddell (181) the matrix for a pair of dielectrics having no loss and an optical thickness of $\lambda/4$ is $$M = \begin{pmatrix} 0 & i\mu_L^{-1} \\ i\mu_L & 0 \end{pmatrix} \begin{pmatrix} 0 & i\mu_H^{-1} \\ i\mu_H & 0 \end{pmatrix} = -\begin{pmatrix} \frac{\mu_H}{\mu_L} & 0 \\ 0 & \frac{\mu_L}{\mu_H} \end{pmatrix}$$

where
  $\mu = n/\cos\theta$ for p-polarized light
  and $\mu = n\cos\theta$ for s-polarized light (n = refractive index)
  and subscript L implies 'low'
  and subscript H implies 'high'
For q pairs the matrix will be:

$$M^q = (-1)^q \begin{pmatrix} \left(\frac{\mu_H}{\mu_L}\right)^q & 0 \\ 0 & \left(\frac{\mu_L}{\mu_H}\right)^q \end{pmatrix}$$

$$= (-1)^q \begin{pmatrix} U & 0 \\ 0 & U^{-1} \end{pmatrix}$$

where $U = \left(\frac{\mu_H}{\mu_L}\right)^q$

As $q \to \infty$, $U^{-1} \to 0$ and $M^q = (-1)^q \begin{pmatrix} U & 0 \\ 0 & 0 \end{pmatrix}$ If the outermost layer of the stack is a $\lambda/4$ layer with loss, assumed small, the matrix can be represented by:

$$M_T = \begin{pmatrix} i\Delta & i\mu_H^{-1} \\ i\mu_H & i\Delta \end{pmatrix}$$

where $\Delta = \frac{k\pi}{2n}$

This is obtained by putting the phase thickness $$\delta = \frac{2\pi(n-ik)d\cos\theta}{\lambda}$$

where
  (n − ik) is the complex refractive index
  d is the metric thickness
  $\theta$ is the angle of the beam in the layer and p1 $\lambda$ is the free space wavelength
The above expression can be written as:

$$\delta = \frac{2\pi n d\cos\theta}{\lambda} - i\frac{2\pi k d\cos\theta}{\lambda}$$

If $\frac{n d\cos\theta}{\lambda} = \frac{\pi}{2}$, then $\delta = \frac{\pi}{2} - i\frac{k\pi}{2n}$ putting $\frac{k\pi}{2n} = \Delta$ makes $\cos\delta = \cos\left(\frac{\pi}{2} - i\Delta\right)$ $$= \cos\frac{\pi}{2}\cosh\Delta - i\sin\frac{\pi}{2}\sinh\Delta$$

$$\approx i\Delta$$

when k is small
Similarly $$\sin\delta = \sin\left(\frac{\pi}{2} - i\Delta\right)$$

$$= \sin\frac{\pi}{2}\cosh\Delta - i\cos\frac{\pi}{2}\sinh\Delta$$

$$\approx 1$$

The matrix for the stack with a lossy layer outermost and a half wave next to it can be written as:

$$M = i\begin{pmatrix} \Delta & \mu_H^{-1} \\ \mu_H & \Delta \end{pmatrix} \begin{pmatrix} 0 & i\mu_L^{-1} \\ i\mu_L & 0 \end{pmatrix} \times (-1)^q \begin{pmatrix} U & 0 \\ 0 & 0 \end{pmatrix}$$

The second matrix on the RHS represents the matrix for a quarter wave layer because the final matrix represents a stack with a quarter wave of $SiO_2$ on top.
This gives:

$$M = i(-1)^q \begin{pmatrix} \Delta & \mu_H^{-1} \\ \mu_H & \Delta \end{pmatrix} \begin{pmatrix} 0 & 0 \\ i\mu_L U & 0 \end{pmatrix}$$

$$= (-1)^{(q+1)} \begin{pmatrix} \mu_H^{-1}\mu_L U & 0 \\ \Delta\mu_L U & 0 \end{pmatrix}$$

Using the standard notation the E field in front of the MLD is given by:

$$\begin{pmatrix} E_A^+ + E_A^- \\ \mu_A E_A^+ - \mu_A E_A^- \end{pmatrix} = M \begin{pmatrix} E_S^+ \\ \mu_S E_S^+ \end{pmatrix}$$

where $E_A^+$ and $E_A^-$ are the components of the electric field parallel to the interfaces in the positive (incident) and negative (reflected) directions. Subscripts A and S relate to air and substrate respectively.

Substituting for M gives:

$$\begin{pmatrix} E_A^+ + E_A^- \\ \mu_A E_A^+ - \mu_A E_A^- \end{pmatrix} = (-1)^{(q+1)} \begin{pmatrix} \frac{\mu_L}{\mu_H} U & 0 \\ \Delta \mu_L U & 0 \end{pmatrix} \begin{pmatrix} E_S^+ \\ \mu_S E_S^+ \end{pmatrix}$$

So that:

$$E_A^+ + E_A^- = (-1)^{(q+1)} \mu_L U E_S^+ \mu_H^{-1} \quad (1)$$

and $\mu_A E_A^+ - \mu_A E_A^- = (-1)^{(q+1)} \mu_L U E_S^+ \Delta \quad (2)$

So that:

$$E_A^+ + E_A^- = (-1)^{(q+1)} \mu_L U E_S^+ \mu_H^{-1} \quad (1)$$

and $\mu_A E_A^+ - \mu_A E_A^- = (-1)^{(q+1)} \mu_L U E_S^+ \Delta \quad (2)$

Multiplying (1) by $\mu_A$ and subtracting (2) gives:

$$2\mu_A E_A^- = (-1)^{(q+1)} \mu_L U E_S^+ \left( \frac{\mu_A}{\mu_H} - \Delta \right)$$

Multiplying (1) by $\mu_A$ and adding to (2) gives:

$$2\mu_A E_A^- = (-1)^{(q+1)} \mu_L U E_S^+ \left( \frac{\mu_A}{\mu_H} + \Delta \right)$$

The reflection coefficient $$r = \frac{E_A^-}{E_A^+} = \frac{\mu_A - \Delta \mu_H}{\mu_A + \Delta \mu_H}$$

It must be remembered that $\mu_H$ is really complex $(= \mu_H' - i\mu_H'')$ so that $$r = \frac{\mu_A - \Delta \mu_H' + i\Delta \mu_H''}{\mu_A + \Delta \mu_H' - i\Delta \mu_H''}$$

The reflectivity $R = rr^*$ is given by:

$$R = \frac{(\mu_A - \Delta \mu_H')^2 + (\Delta \mu_H'')^2}{(\mu_A + \Delta \mu_H')^2 + (\Delta \mu_H'')^2}$$

since $\frac{\mu_H''}{\mu_H'} \sim \frac{k}{n}$ the term containing $\mu_H''$ can be neglected. This gives:

$$R \simeq \frac{(\mu_A - \Delta \mu_H)^2}{(\mu_A + \Delta \mu_H)^2}$$

$$\frac{\left(1 - \Delta \frac{\mu_H}{\mu_A}\right)^2}{\left(1 + \Delta \frac{\mu_H}{\mu_A}\right)^2}$$

or, to a good approximation when $\Delta$ is small and ignoring squared terms and above $$R = 1 - 4\Delta \frac{\mu_H}{\mu_A}$$

so that the loss $$L = 1 - R = 4\Delta \frac{\mu_H}{\mu_A}$$

$$\frac{\mu_H}{\mu_A} \text{ (for } p\text{-polarization)} = \frac{n_H}{n_A} \frac{\cos\theta_A}{\cos\theta_H}$$

and for s-polarization is $$\frac{n_H}{n_A} \frac{\cos\theta_H}{\cos\theta_A}$$

As $\theta_A > \theta_H$, $\cos\theta_A < \cos\theta_H$

Hence the loss for p-polarized light is less than that for s-polarized light.

I claim:

1. A mirror comprising a multi-layer dielectric (MLD) reflective stack and a dielectric layer which acts as a half-wave spacer for a specific wavelength of light at a predetermined angle of incidence so as to enhance the absorption or transmission, or both, of s-polarized light relative to that of p-polarized thereby to enhance the reflection of p-polarized light relative to that of s-polarized light further comprising a metal layer underlying said half-wave spacer.

2. A mirror according to claim 1 wherein said metal is gold or silver.

3. A mirror comprising a multi-layer dielectric (MLD) reflective stack and a dielectric layer which acts as a half-wave spacer for a specific wavelength of light at a predetermined angle of incidence so as to enhance the absorption or transmission, or both, of s-polarized light relative to that of p-polarized thereby to enhance the reflection of p-polarized light relative to that of s-polarized light further comprising an off-tune MLD underlying said half-wave spacer.

4. A mirror comprising a multi-layer dielectric (MLD) reflective stack and a dielectric layer which acts as a half-wave spacer for a specific wavelength of light at a predetermined angle of incidence so as to enhance the absorption or transmission, or both, of s-polarized light relative to that of p-polarized thereby to enhance the reflection of p-polarized light relative to that of s-polarized light further comprising a magneto-optic layer.

5. A mirror according to claim 4 wherein the magneto-optic layer comprises a garnet material.

6. A ring laser gyroscope comprising a mirror including a multi-layer dielectric (MLD) reflective stack and a dielectric layer which acts as a half-wave spacer for a specific wavelength of light at a predetermined angle of incidence so as to enhance the absorption or transmission, or both, of s-polarised light relative to that of p-polarised light thereby to enhance the reflection of p-polarised light relative to that of s-polarised light.

7. A mirror comprising a multi-layer dielectric (MLD) reflective stack and a half-wavelength dielectric layer of high refractive index overlying said MLD stack so as to enhance the absorption or transmission, or both, of s-polarized light relative to that of p-polarized light thereby to enhance the reflection of p-polarized light relative to that of s-polarized light.

* * * * *